Nov. 11, 1947.　　　　F. O. JORDAN　　　　2,430,614
HYDRAULIC TRANSMISSION
Filed May 25, 1944　　　　3 Sheets-Sheet 1
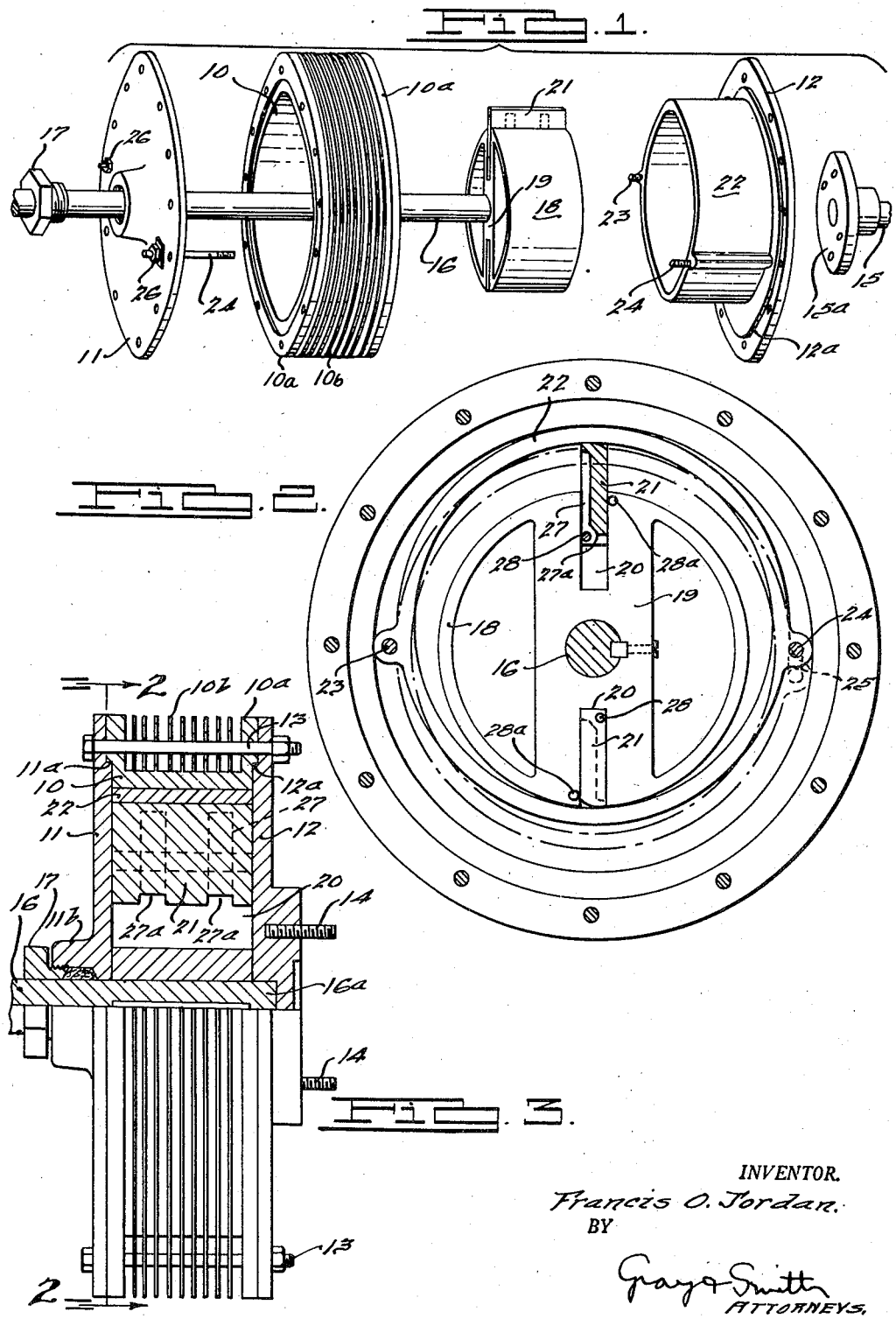
INVENTOR.
Francis O. Jordan.
BY
Gray & Smith
ATTORNEYS.

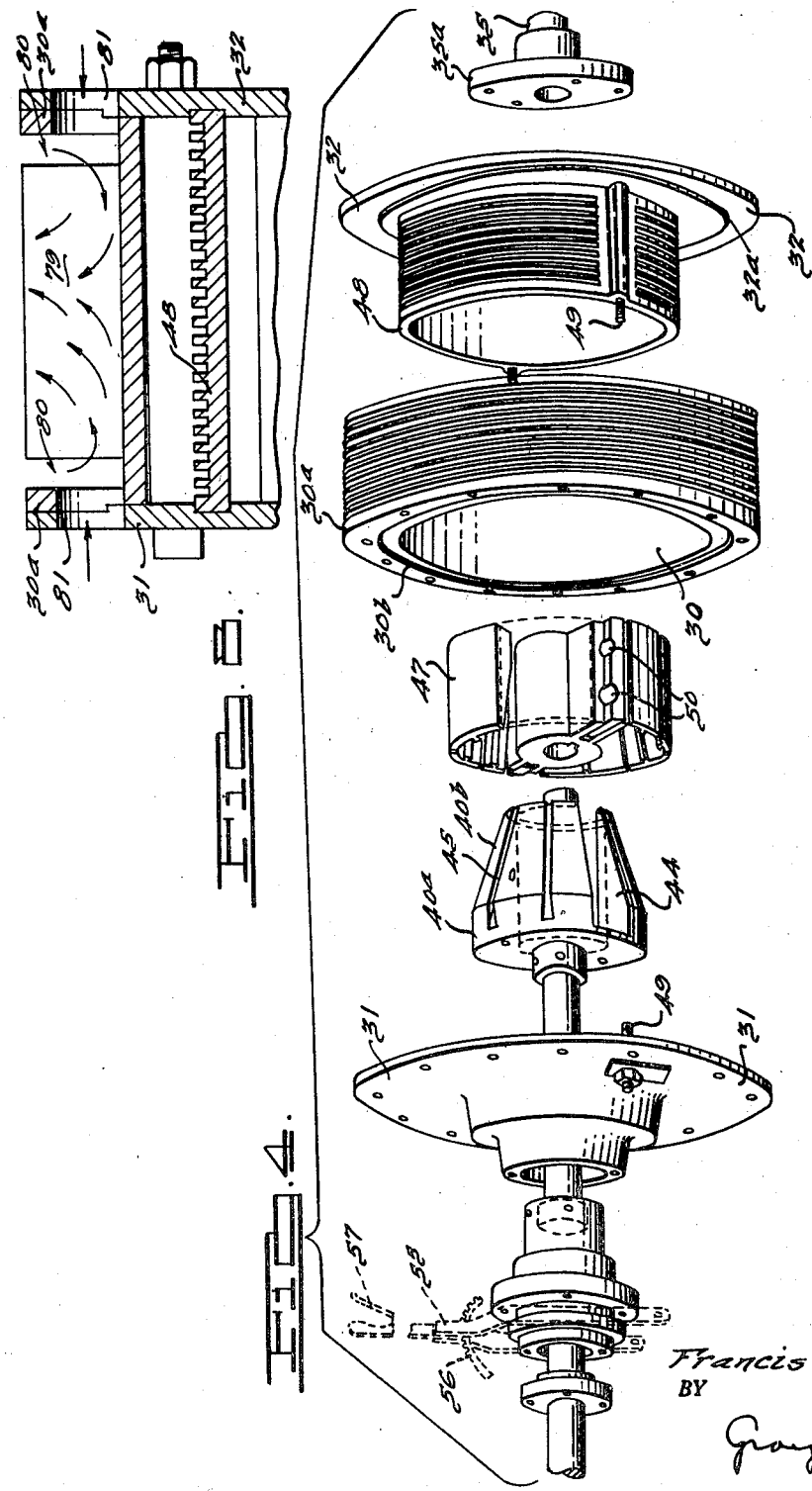

Nov. 11, 1947.   F. O. JORDAN   2,430,614
HYDRAULIC TRANSMISSION
Filed May 25, 1944   3 Sheets-Sheet 3
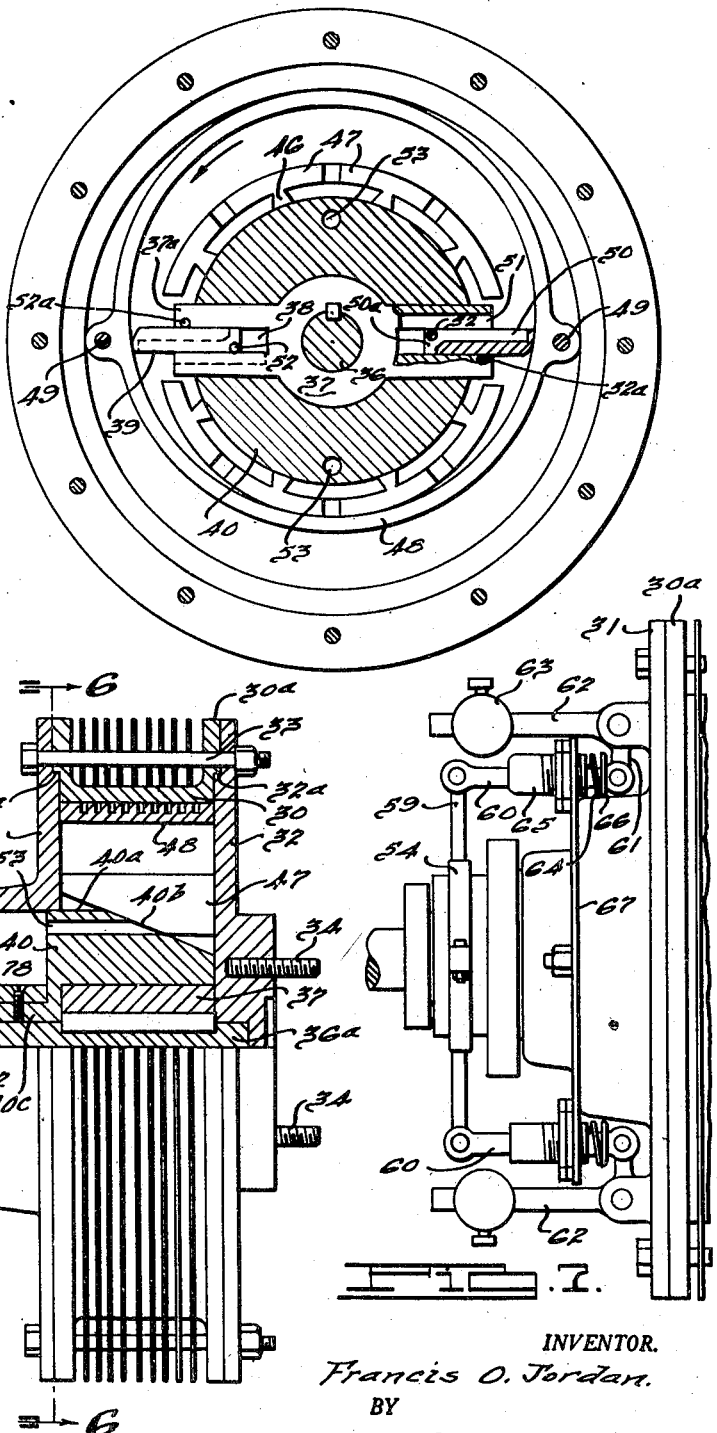
INVENTOR.
Francis O. Jordan.
BY
Gray & Smith
ATTORNEYS.

Patented Nov. 11, 1947

2,430,614

UNITED STATES PATENT OFFICE 2,430,614

HYDRAULIC TRANSMISSION

Francis O. Jordan, Grosse Pointe Farms, Mich.

Application May 25, 1944, Serial No. 537,347

11 Claims. (Cl. 192—58)

This invention relates to variable speed transmissions and more particularly to a hydraulic pressure unit, clutch or the like for transmitting torque or power from a driving element to a driven element so as to produce any desired constant or variable speed ratio therebetween.

An object of the invention is to provide a transmission in which a hydraulic unit of improved construction is interposed between driving and driven elements and in which the power or torque is transmitted from one to the other substantially entirely by oil pressure without the use of gears or resort to friction between relatively moving surfaces for the transmission of power.

A further object of the invention is to provide an improved hydraulic pressure drive for transmitting power from a driving shaft to a driven shaft in which a vane carrying rotor secured to the driving shaft is rotatable within an eccentric ring or shell adjustable as to eccentricity with respect to the rotor and fitting within a housing in such manner as to enclose a body of oil or other fluid means adapted to be forced by the vanes circumferentially around the rotor within the space between the rotor and eccentric ring whereby rotative effort is transmitted to the ring and housing and thence to the driven shaft by hydraulic pressure.

Still another object of the invention is to provide an improved hydraulic transmission in which a vane carrying rotor of constant diameter attached to the driving or input shaft is rotatable within an enclosed ring or shell capable of being adjusted eccentrically with respect to the axis of the rotor and drivingly connected to the driven or output shaft.

A still further object of the invention is to provide an improved hydraulic transmission in which a vane carrying rotor of variable diameter attached to the driving or input shaft is rotatable within an eccentric ring or shell drivingly connected to the driven or output shaft, the improved construction being such that the effective diameter of the rotor may be varied manually or automatically so as to obtain the desired speed ratio or ratios between the input and output shafts.

Another object of the invention is to provide a hydraulic pressure drive unit, interposed between driving and driven elements having a rotor operable within an eccentric ring or shell, and in which the movement of the oil or other fluid medium circumferentially within the space between the rotor and ring is produced by radially shiftable vanes carried by the rotor and constantly pressed outwardly into contact with the eccentric ring not only by centrifugal force but also by the pressure of the oil built up in advance of the leading faces of the vanes.

A further object of the invention is to provide a hydraulic pressure drive unit or clutch which is relatively simple and compact in construction and relatively inexpensive to manufacture, which is capable of sustained operation without danger of failure of the fluid medium due to excessive overheating, in which heat generation and consequent loss of power are reduced, and which may be adapted to meet a wide range of operating requirements while achieving efficient and economical performance.

Other objects of this invention will appear in the following description and appended claims, reference being had to the accompanying drawings forming a part of this specification wherein like reference characters designate corresponding parts in the several views.

Fig. 1 is an exploded view illustrating in perspective the component parts of a hydraulic pressure drive unit constructed in accordance with one embodiment of the invention.

Fig. 2 is a section taken substantially through lines 2—2 of Fig. 3 looking in the direction of the arrows.

Fig. 3 is a side elevation, partly in section, of the hydraulic unit embodying the parts shown in Fig. 1 when assembled.

Fig. 4 is an exploded view illustrating in perspective the component parts of a hydraulic pressure drive unit constructed in accordance with another embodiment of the invention.

Fig. 5 is a side elevation, partly in section, illustrating the assembled parts shown in Fig. 4.

Fig. 6 is a section taken substantially through lines 6—6 of Fig. 5 looking in the direction of the arrows.

Fig. 7 is a fragmentary side elevation illustrating centrifugally operated means for controlling the speed adjusting mechanism for the unit illustrated in Figs. 4, 5 and 6.

Fig. 8 is a fragmentary sectional view illustrating a modified form of cooling means for dissipating heat generated in the fluid medium within the housing.

Before explaining in detail the present invention it is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

Referring to Figs. 1 to 3 inclusive in which I have illustrated, by way of example, one embodiment of the invention, the hydraulic pressure drive unit therein shown comprises in general a rotor provided with two radially shiftable vanes adapted to be pressed outwardly into engagement with an eccentric ring within which the rotor revolves. The rotor and eccentric ring are enclosed within an oil-filled, oil-tight housing and the ring is pivotally mounted with respect to the housing to permit it to be adjusted into various eccentric positions. The rotor is secured to the input or high speed shaft which is driven by any suitable source of power. On the other hand, the housing together with the eccentric ring is attached to the output or low speed shaft so as to rotate therewith. The radially slidable vanes carried by the rotor are pressed outward into constant engagement with the inner surface of the eccentric ring both by centrifugal force and also by oil pressure which is conveyed by oil ducts to the inner ends of the vanes so that oil pressure built up in the space between the rotor and eccentric ring will at all times hold the vanes outwardly in contact with the ring.

The hydraulic unit of the foregoing embodiment comprises a cylindrical housing or casing 10 provided with annular projecting edge flanges 10a and intervening cooling fins 10b. The open ends of the housing 10 are closed by means of a front cover plate 11 and a back cover plate 12 rigidly secured to the housing by means of through bolts 13. Projecting from the back cover plate 12 are coupling bolts 14 adapted to be secured to a coupling flange 15a which in turn is secured to the output or low speed driven shaft 15. As illustrated in Fig. 3, the housing 10 and the cover plates 11 and 12 have interfitting annular portions provided for the purpose of accurately centering or locating the housing with respect to the end plates and also for providing an oil tight joint. As illustrated the end plates 11 and 12 are machined to provide annular portions of reduced thickness forming centering ledges 11a and 12a, respectively, and the flanges 10a of the housing having correspondingly shaped annular portions fitting thereinto and overlying these ledges. In this manner the housing will be properly centered with respect to the end plates and when these parts are bolted together a leak-tight joint will be provided.

Extending through an aperture in the hub 11b of the front cover plate 11 is an input or high speed drive shaft 16. The end 16a of this shaft is piloted within a hole in the back cover plate 12. Interposed between the hub 11b of the front cover plate and the shaft 16 is a suitable packing which is engaged by a packing nut 17 threaded into a tapped hole in the hub. Interposed between the cover plates 11 and 12 is an annular rotor 18 having a central cross-head 19 bored to receive the drive shaft 16 and keyed thereto. The cross-head 19 is provided with diametrically opposed radially extending slots 20 within which are slidingly mounted a pair of vanes 21. The outer ends of these vanes are adapted to contact the inner surface of an eccentric ring 22. This ring is secured in fixed position to the front and back cover plates by means of through bolts 23 and 24, the eccentric ring being provided with projecting ribs drilled for the reception of the bolts. It will be noted that the attaching bolts 23 and 24 for the eccentric ring extend in a plane substantially at right angles to the plane of the vanes 21 and in the preferred construction the eccentric ring is mounted for angular adjustment about the bolt 23 which forms a pivot. Accordingly, the bolt 24 extends through an arcuate slot 25 in the back cover plate 12. The adjusting slot 25 is formed on an arc having its center at the pivot bolt 23. Threaded onto opposite ends of each of the bolts 23 and 24 are nuts 26 which may be drawn down against the cover plates to clamp the eccentric ring in adjusted position. By loosening the nuts the eccentric ring may be shifted a limited distance about its axis formed by the pivot bolt 23 thereby shifting the position of the bolt 24 within the adjusting slot 25. After the desired adjustment has been made in this manner the eccentric ring may be rigidly clamped in position by means of the nuts 26.

During rotation of the rotor 18 in a counter-clockwise direction as viewed in Fig. 2 it will be understood that normally the vanes 21 will be pressed out into contact with the eccentric ring 22 by centrifugal force. However, in order to supplement this action and particularly to insure constant engagement of the vanes with the eccentric ring, especially when rotation of the rotor commences, provision is made for forcing the vanes outwardly under the pressure of the oil built up ahead of the vanes in the chamber between the rotor and the eccentric ring. To accomplish this the leading face of each vane 21 is formed with a plurality, such as two, of oil grooves or ducts 27. As clearly shown in Fig. 2, each of these grooves terminates just short of the outer edge of the vane so as to direct oil under all operating conditions into the groove 27 as the vane is carried around by the rotor. The inner end of each groove 27 communicates with a transverse groove 27a extending across the inner edge of the vane. Thus, it will be seen that when the rotor commences to revolve oil under pressure in advance of the vanes will be forced through the grooves 27 and 27a thereby exerting an outward pressure against the inner ends of the vanes within the slots 20 resulting in positively forcing the vanes outwardly into contact with the inner surface of the eccentric ring 22 and hence preventing any substantial leakage of oil past the vanes tending to dissipate the pressure of the oil built up in advance of the vanes in the space between the rotor and the eccentric ring.

In order to insure maximum freedom of movement of the vanes 21 within the slots 20 and to prevent binding and wear due to thrust caused by the pressure of the oil against the vanes when extended, each vane is adapted to travel on a pair of roller bearings 28 and 28a extending the width of the vane. The roller 28 is inserted into a drilled hole in the inner end of the vane and has rolling engagement with the adjacent wall of the slot. The roller 28a is inserted into a drilled hole in the rotor adjacent the outer end of the slot and has rolling engagement with the adjacent face of the vane. The rollers project only a slight distance into the slots sufficient to have the needed rolling contact, this being permitted by the operating clearance of the vanes in the slots.

From the foregoing construction the operation of the hydraulic unit of this embodiment will be readily understood. When the eccentric ring 22 is in a position concentric with the axis of the rotor 19 and the shaft 16 is rotated, it will be apparent that the eccentric ring, housing and driven shaft 15 will have no rotative effort transmitted to them by the driving shaft for the reason that the vanes 21 carried by the rotor will merely push the oil around without resistance within the annular space between the eccentric ring and rotor. However, when the eccentric ring is adjusted about its axis 23 to an eccentric position, such as that illustrated in Figs. 2 and 3, the clearance between the eccentric ring and rotor is reduced at one side of the shaft 16 and increased at the opposite side. Hence, during rotation of the rotor through the medium of the input shaft 16 a resistance to the circumferential movement of oil caused by the travel of the vanes will be introduced at the side of the rotor where the space between the rotor and eccentric ring has been reduced or constricted. Under these conditions the eccentric ring and housing will receive a rotative impulse, causing them to revolve with the rotor due to the fact that the vanes build up oil pressure in the space of diminishing depth between the vanes. Thus, it will be seen that the power delivered to the rotor from the input shaft 16 will be transmitted by oil pressure to the eccentric ring and thence through the housing to the output or low speed shaft 15. As the eccentricity of the ring 22 is increased the annular speed of the shaft 15 will increase and will approach the speed of the input shaft due to the fact that the clearance between the eccentric ring and rotor at one side of the input shaft is increasingly reduced so as to increase the resistance to the movement of oil induced by the vanes. When the eccentric ring is adjusted to a position, as illustrated in Fig. 2, where it bears against the rotor at one side of the shaft 16 a body of oil will be trapped between the rotor, eccentric ring and the vanes and, hence, under these conditions a one to one ratio will be produced between the input and output shafts which will then rotate at the same speed.

In the embodiment of the invention illustrated in Figs. 4 to 7 inclusive, the hydraulic pressure drive unit therein shown utilizes an eccentric ring mounted in fixed position within an oil tight housing and within which revolves a variable diameter rotor or rotor assembly carrying two vanes which under all conditions of operation are pressed outwardly against the inner surface of the eccentric ring. The construction of the unit of this embodiment is in many respects similar to the previous embodiment with the principal exception that the rotor, which is attached to the input shaft, comprises a central vane holder, an outer series of annularly arranged wedge shaped segments and an axially adjustable speed adjusting cone splined to the segments and interposed between the vane holder and segments. As a result of this construction the effective diameter of the rotor and, hence, the speed ratio between the input and output shafts may be varied by shifting the speed adjusting cone axially of the shaft.

Referring to Figs. 4 to 6 inclusive, the hydraulic unit therein shown comprises a cylindrical housing 30 closed at opposite ends by means of a front cover plate 31 and a back cover plate 32. The housing is provided with annular projecting edge flanges 30a and intervening cooling fins. As in the previous embodiment the cover plates are machined to provide annular marginal recesses terminating in centering or locating ledges or shoulders 31a and 32a to receive annular projecting portions on the housing flanges 30a. Thus, the housing and end plates have accurately interfitting portions to provide leak-tight joints and the parts are secured together by means of through bolts 33. Extending from the back cover plate 32 are coupling bolts 34 by means of which the housing is rigidly secured to a coupling flange 35a keyed to the output or low speed driven shaft 35.

The input or high speed drive shaft is shown at 36 and has its end 36a piloted in a hole in the hub of the back cover plate 32. Keyed to the shaft 36 is the hub of a vane holder 37 having diametrically opposed portions 37a provided with slots 38 within which are slidingly mounted a pair of vanes 39.

Slidable upon the vane holder 37 is a speed adjusting cone 40. This member has a cylindrical portion 40a fitting within an annular space 41 formed in a boss 31b of the front cover plate 31. Thus, by virtue of the annular portion 40a the cone member 40 will at all times be guided within at least a portion of the correspondingly shaped annular wall of the space or chamber 41. The adjusting member 40 is also provided with a frusto-conical portion 40b. It also has a hub portion 40c bored to receive the input shaft 36 and secured to a sleeve 42 through which the shaft extends, as illustrated in Fig. 5. The central arcuate portion of the cone member 40 has a smooth sliding fit on the hub of the vane holder 37 and is formed with diametrically opposed slots 44 through which the vane holder portions 37a project.

A suitable packing gland 43 is confined in a recess in the end of the sleeve 42 in engagement with the shaft 36. The outer edge of the packing is engaged by a packing nut 43a which is drawn up to effect a predetermined sealing pressure on the gland. The inner edge of the gland abuts against a pressure ring 75 which is exposed to oil pressure in an annular groove or channel 76 in the sleeve 42 extending around the shaft 36. The ring 75, as shown in Fig. 5, abuts against a shoulder at the outer end of the channel and hence is shiftable on the shaft only outwardly against the packing gland. Oil passing along the shaft and entering the channel 76 under pressure will thus force the ring 75 outwardly to compress the gland and increase its oil sealing action. It will be seen that the amount of compression of the gland due to the action of the ring 75 will be proportionate to the oil pressure within the housing.

The adjusting cone 40 is formed around its outer side with a series of longitudinally extending wedge shaped grooves or key ways 45 within each of which is slidingly received a correspondingly shaped spline 46 integrally formed on one of a corresponding series of rotor segments 47. As illustrated in Fig. 6, eight of these segments 47 are provided, four at each side of the vanes 39. Each segment thus has an interlocking connection with the adjusting cone 40 through the medium of a spline 46 fitting within a groove or keyway 45. Through the medium, therefore, of these connections the rotor segments 47 are slidable on the outer frusto-conical surface of the adjusting cone but are held against disengagement therefrom in a radial direction. Moreover, it will be seen from Fig. 5 that the segments 47 fit smoothly between the end plates 31 and 32 so that when the cone 40 is shifted longitudinally the segments 47 will slide outwardly or inwardly in a radial direction by virtue of their guiding contact with the inner surfaces of the end plates. Thus, the rotor in the present embodiment is composed of a series of annularly arranged segments 47 which may be drawn together to produce a rotor of small diameter by shifting the cone 40 to the left in Fig. 5 or which may be expanded outwardly to produce a rotor of relatively large diameter by shifting the cone 40 to the position shown in Figs. 5 and 6.

The segmental rotor is mounted within an eccentric ring 48 which is secured in fixed position to the front and back cover plates 31 and 32 through the medium of through bolts 49. The vanes 39 are at all times pressed outwardly in contact with the inner surface of the eccentric ring by centrifugal force supplemented by oil pressure directed outwardly against the inner ends of the vanes. This is accomplished by forming a plurality, such as two, of oil grooves or ducts 50 in each vane which communicate with transverse grooves 50a extending across the inner edges of the vanes. The grooves 50 communicate with registering grooves 51 formed in the holder sections 37a of the vane holder. Thus, as in the previous embodiment, during rotation of the rotor in the direction of the arrow the oil pressure built up at the leading faces of the vanes will be transmitted through the oil grooves 50—51 to the inner edges of the vanes thereby forcing them outwardly into contact with the eccentric ring. As in the previous embodiment bearing rollers 52 and 52a may be provided for each of the vanes to insure freedom of movement thereof in the slots 38. These rollers are mounted and function in the same manner as rollers 28 and 28a hereinabove described. The adjusting cone 40 is provided at opposite sides of the shaft 36 with holes 53 connecting the chamber 41 with the space between the rotor and the eccentric ring. These holes provide pressure equalizing passages to permit unopposed movement of the adjusting cone 40 in either direction.

The shifter sleeve 42 attached to the adjusting cone is provided at its end with an annular groove to receive a non-rotatable ring 54 to which means may be connected for shifting the sleeve longitudinally in order to adjust the position of the cone member 40 and, hence, vary the diameter of the segmental rotor. As illustrated in Fig. 4, manual control means may be utilized for shifting the ring 54 comprising, for example, a forked lever 55 pivoted at its lower end and attached to the ring. This lever is provided with a detent engageable with a toothed quadrant 56, the detent being controlled by a handle lever 57. By withdrawing the detent from the quadrant the lever may be swung to shift the ring 54.

The chamber 41 in the hub 31b of the front cover plate is sealed against leakage of oil past the shifter sleeve 42 by means of a suitable packing gland 77 engaged at its outer end by a packing nut 58 adjustably secured to the end of the hub 31b. A pressure ring 78 engages the inner end of the packing gland and is shiftable to compress the gland by the oil pressure in chamber 41. As this pressure increases the ring 78 will be forced outwardly progressively thereby tightening the gland and increasing the sealing action thereof.

The shifter ring 54 may be automatically adjusted, as illustrated in Fig. 7, by centrifugally operated governing means controlled by the speed of rotation of the housing and, hence, the driven or output shaft 35. As shown in Fig. 7, two diametrically opposed non-rotating arms 59 are fastened to the ring 54, and pivoted to the outer ends of these arms are a pair of push and pull links 60. Each link 60 is pivoted to the depending arm 61 of a bell crank lever pivoted to a bracket secured to the front cover plate 31. The other arm 62 of the bell crank lever carries a fly ball or weight 63 adjustably secured thereon. Each link 60 is guided in a tubular casing 65 within which extends one end of a compression spring 64, the opposite end of the spring bearing against retainer 66 on the link. From this construction it will be seen that as the speed of the driven shaft increases the fly balls 63 will move outwardly by centrifugal force thereby swinging the bell crank levers and shifting the links 60 to the left in Fig. 7 and, through their connections with the ring 54 and sleeve 42, retracting the adjusting cone 40 to the left in Fig. 5. This operation will reduce the effective diameter of the segmental rotor thereby causing a reduction in the hydraulic drive between the rotor and the eccentric ring 48 producing a reduction in the speed of the driven shaft. Thus, it will be seen that the mechanism shown in Fig. 7 will automatically maintain a substantially constant set speed ratio between the driving and driven shafts 36 and 35 since any increase or decrease in the set speed of the driven shaft will be accompanied by movement of the fly balls 63 outwardly or inwardly under centrifugal force resulting in decreasing or increasing the effective diameter of the rotor.

When the cone 40 is shifted to its forward limit within the segmental rotor the segments of the latter will be spread to their maximum effective diameter so as to bear at one side of the shaft against the inner surface of the eccentric ring. Under this condition a body of oil will be trapped between the rotor, eccentric ring and one of the vanes and hence the driven shaft will rotate at substantially the same speed as the driving shaft. This condition is shown in Figs. 5 and 6 so that with the parts positioned as shown in these figures a direct drive will be produced. Conversely, when the cone 40 is withdrawn from the rotor to its limit within the chamber 41, the outside diameter of the segmental rotor will be reduced so that a body of oil will no longer be trapped because under this condition the rotor no longer bears against the eccentric ring. This permits a maximum circumferential movement of oil between the rotor and ring at which time no torque or rotative effort will be transmitted to the driven shaft sufficient to rotate the same. The speed of the driven shaft, therefore, will vary in accordance with the position of adjustment of the cone 40 and the diameter of the segmental rotor.

In Fig. 8 there is illustrated a modified construction for dissipating heat generated in the fluid medium within the space between the housing 10 or 30 and the eccentric ring and also in the space between the latter and the rotor. In lieu of the cooling fins on the housing I provide a series of circumferentially spaced radially projecting fan blades 79 rigidly attached to the housing and extending outwardly therefrom, the blades terminating short of the housing flanges 30a to provide air passages 80 at opposite ends of each blade. Ports 81 are drilled through the cover plates 31 and 32 and also through the housing flanges to provide additional air passages communicating with passages 80 opposite the fan blades. The number of ports 81 may correspond to the number of fan blades extending around the periphery of the housing.

During rotation of the housing air will be thrown out by the fan blades, as indicated by the arrows in Fig. 8 and, hence, replacement air will rush in through passages 30 and 81 along the surface of the housing between the blades. As a result, a rapid circulation of air will be induced by the fan blades with the air having a directional flow across the outer surface of the housing and the blade surfaces and thence outwardly. More efficient cooling and dissipation of heat are thus provided in accordance with this embodiment of the invention. Referring to Fig. 7, it will be understood that the governor therein shown can be set so as to maintain a substantially constant speed of the driven member regardless of wide variations in the speed of the driving member above the speed of the driven member. This control of the driven shaft is important, for example, for many uses of this embodiment of the invention, such as where it is desired to drive a compressor from the engine drive shaft of a vehicle and maintain its operation at a substantially constant speed.

I claim:

1. A hydraulic pressure drive unit comprising a cylindrical housing adapted to contain a fluid medium and having means for attachment to a driven shaft, a ring eccentrically mounted within the housing, a generally cylindrical rotor disposed within the ring concentrically with respect to the housing, a driving shaft extending axially into the housing and secured to the rotor for driving the same, means for varying the effective diameter of the rotor, and radially extending vanes carried by the rotor and engageable with the inner surface of the ring during rotation of the rotor.

2. A hydraulic pressure drive unit comprising a cylindrical housing adapted to contain a fluid medium and having means for attachment to a driven shaft, a ring mounted within the housing, means for attaching the ring to the housing in eccentric position therein, a generally cylindrical rotor disposed within the ring concentrically with respect to the housing, a driving shaft extending axially into the housing and secured to the rotor for driving the same, radially extending vanes carried by the rotor and engageable with the inner surface of the ring during rotation of the rotor, and means for varying the effective diameter of the rotor relatively to the eccentric ring.

3. A hydraulic pressure drive unit comprising a cylindrical housing adapted to contain a fluid medium and having means for attachment to a driven shaft, a ring mounted within the housing, means for attaching the ring to the housing in eccentric position therein, a generally cylindrical rotor disposed within the ring concentrically with respect to the housing, a driving shaft extending axially into the housing and secured to the rotor for driving the same, radially extending vanes carried by the rotor and engageable with the inner surface of the ring during rotation of the rotor, and means for varying the effective diameter of the rotor to vary the position of the outer surface thereof relatively to the inner surface of the ring.

4. A hydraulic mechanism for transmitting rotative effort from a driving shaft to a driven shaft, comprising a cylindrical housing adapted to be drivingly connected to the driven shaft, a ring mounted eccentrically within said housing and secured thereto, a rotor drivingly connected to the driving shaft and revoluble within said ring, a plurality of radially extending vanes slidingly carried by the rotor, and means for adjusting the relative positions of the juxtaposed surfaces of the rotor and ring by varying the effective diameter of the rotor.

5. A hydraulic mechanism for transmitting rotative effort between a driving shaft and a driven shaft, comprising a cylindrical housing adapted to be drivingly connected to one shaft, a ring mounted eccentrically within said housing and secured thereto, a rotor drivingly connected to the other shaft and revoluble within said ring, a plurality of radially extending vanes slidingly carried by the rotor, and means for varying the effective diameter of the rotor.

6. A hydraulic mechanism for transmitting rotative effort from a driving element to a driven element, comprising a cylindrical casing adapted to be drivingly connected to the driven element, front and back cover plates secured to the casing to provide a liquidtight housing, a ring disposed eccentrically within the housing and fitting between said cover plates, means for securing the ring to the housing, a generally cylindrical rotor within said ring coaxial with the housing and secured to the driving element, radially extending vanes slidingly carried by the rotor for engagement at their outer ends with the ring, and means for varying the effective diameter of said rotor.

7. A hydraulic mechanism for transmitting rotative effort from a driving element to a driven element, comprising a cylindrical casing adapted to be drivingly connected to the driven element, front and back cover plates secured to the casing to provide a liquidtight housing, a ring disposed eccentrically within the housing and fitting between said cover plates, means for securing the ring to the housing, a generally cylindrical segmental rotor within said ring coaxial with the housing and secured to the driving element, radially extending vanes slidingly carried by the rotor for engagement at their outer ends with the ring, and means for shifting the segments of the rotor outwardly and inwardly to vary the effective diameter of the rotor.

8. A hydraulic mechanism for transmitting rotative effort from a driving shaft to a driven shaft, comprising a cylindrical housing adapted to be drivingly connected to the driven shaft, a ring mounted eccentrically within said housing and secured thereto, a segmental rotor drivingly connected to the driving shaft and revoluble within said ring, a plurality of radially extending vanes slidingly carried by the rotor, and means for shifting the segments of the rotor outwardly and inwardly to vary the effective diameter of the rotor.

9. A hydraulic mechanism for transmitting rotative effort from a driving shaft to a driven shaft, comprising a cylindrical housing adapted to be drivingly connected to the driven shaft, a ring mounted eccentrically within said housing and secured thereto, a segmental rotor drivingly connected to the driving shaft and revoluble within said ring, a plurality of radially extending vanes slidingly carried by the rotor, and means for shifting the segments of the rotor outwardly and inwardly to vary the effective diameter of the rotor, said means comprising a shiftable cone interposed between the driving shaft and rotor segments.

10. In a hydraulic transmission unit, a housing having an eccentric ring, a rotor assembly therein adapted to be drivingly connected as a unit to a driving shaft, said assembly comprising a vane holder, a rotor composed of a series of separate segments, and a cone slidable axially on the vane holder between the latter and said segments for shifting the segments outwardly or inwardly to vary the effective diameter of the rotor.

11. In a hydraulic transmission unit, a housing having an eccentric ring, a rotor assembly therein adapted to be drivingly connected as a unit to a driving shaft, said assembly comprising a vane holder, a rotor composed of a series of separate segments, and a cone slidable axially on the vane holder between the latter and said segments for shifting the segments outwardly or inwardly to vary the effective diameter of the rotor, said cone having interlocking spline connections with the segments.

FRANCIS O. JORDAN.

REFERENCES CITED

The following references are of record in the file of this patent:

UNITED STATES PATENTS

| Number | Name | Date |
|---|---|---|
| 2,236,556 | Wunderle | Apr. 1, 1941 |
| 1,990,874 | Millican | Feb. 12, 1935 |
| 1,917,972 | Henriot | July 11, 1933 |
| 1,894,574 | Shaw | Jan. 17, 1933 |
| 1,186,132 | Rich | June 6, 1916 |

FOREIGN PATENTS

| Number | Country | Date |
|---|---|---|
| 417,193 | Great Britain | Mar. 31, 1933 |